(12) United States Patent
Ibi et al.

(10) Patent No.: US 8,718,151 B2
(45) Date of Patent: May 6, 2014

(54) TRANSMISSION METHOD, RECEPTION METHOD, AND COMMUNICATION METHOD

(75) Inventors: Shinsuke Ibi, Osaka (JP); Seiichi Sampei, Osaka (JP)

(73) Assignee: Osaka University, Osaka (JP)

( * ) Notice: Subject to any disclaimer, the term of this patent is extended or adjusted under 35 U.S.C. 154(b) by 286 days.

(21) Appl. No.: 13/202,826

(22) PCT Filed: Feb. 23, 2010

(86) PCT No.: PCT/JP2010/001190
§ 371 (c)(1),
(2), (4) Date: Aug. 23, 2011

(87) PCT Pub. No.: WO2010/098075
PCT Pub. Date: Sep. 2, 2010

(65) Prior Publication Data
US 2011/0299609 A1    Dec. 8, 2011

(30) Foreign Application Priority Data

Feb. 24, 2009  (JP) ................................ 2009-040884

(51) Int. Cl.
*H04L 27/00*    (2006.01)
(52) U.S. Cl.
USPC .......................................... 375/259; 375/267
(58) Field of Classification Search
USPC ..................... 375/267, 299, 259, 260, 341
See application file for complete search history.

(56) References Cited

U.S. PATENT DOCUMENTS

| 5,937,015 A * | 8/1999 | Dent et al. ................ 375/341 |
| 7,349,447 B1 * | 3/2008 | Sung et al. ................ 370/535 |
| 2003/0081655 A1 * | 5/2003 | Nakamura et al. ......... 375/141 |
| 2006/0029169 A1 * | 2/2006 | Gatherer et al. ........... 375/347 |
| 2008/0294959 A1 * | 11/2008 | Chindapol et al. ......... 714/752 |

OTHER PUBLICATIONS

International Search Report issued Jun. 1, 2010 in International (PCT) Application No. PCT/JP2010/001190.
R. Ahlswede et al., "*Network Information Flow*", IEEE Transactions on Information Theory, vol. 46, No. 4, Jul. 2000.

(Continued)

*Primary Examiner* — Emmanuel Bayard
(74) *Attorney, Agent, or Firm* — Wenderoth, Lind & Ponack, L.L.P.

(57) ABSTRACT

A transmission method according to the present invention has been conceived assuming an environment where two information source nodes independently communicate with one destination node, and thus is applicable to such a simple topology. The transmission method provides an inter-node cooperation relationship which provides a sufficient advantageous effect even in an environment in which there is a difference in the power levels of the received signals that reach the address node via two routes. The transmission method is performed by a node $U_1$ (40) and a node $U_2$ that is located closer to the node D (60) than the node $U_1$ (40) to transmit signals to a node D (60) which iteratively detects a log likelihood ratio between mutually corresponding pairs of bits included in the signals at constellation points. According to the transmission method, the node $U_1$ (40) modulates the first bit sequence to generate a first signal and transmits the generated first signal, and the node $U_2$ (50) receives the first signal, performing logical operation on the second bit sequence and the first bit sequence included in the received first signal to generate a third bit sequence, modulates the generated third bit sequence to generate a second signal, and transmits the generated second signal.

7 Claims, 14 Drawing Sheets

(56) References Cited

OTHER PUBLICATIONS

Y. Chen et al., "*Wireless Diversity through Network Coding*", in Proc. WCNC'06, vol. 3, Las Vegas, NV, USA, Apr. 2006.

S. Zhang et al., "*Joint design of network coding and channel decoding for wireless networks*", in Proc. WCNC '07, Hong Kong, 2007.

Masatoshi Mizobuchi et al., "*A Study on Signal Discrimination for Cooperative Relay using Cooperative Coding and Decoding Techniques in Multi-node Relay System*", IEICE Technical Report, RCS, The Institute of Electronics, Information and Communication Engineers, Feb. 25, 2009.

C. Hausl and P. Dupraz, "*Joint network-channel coding for the multiple-access relay channel*", IEEE SECON '06, vol. 3, pp. 817-822, 2006.

Nguyen Vu Phong et al., "*Musen Mesh Network ni Okeru Network Coding o Mochiita Data Tenso Tokusei no Kojo ni Kansuru Ichi Kento*", IEICE Technical Report. RCS, Musen Tsushin System, vol. 107, No. 438, pp. 19-24, The Institute of Electronics, Information and Communication Engineers, Jan. 17, 2008.

Xiao, L., et al., "*A network coding approach to cooperative diversity*", IEEE Transactions on information theory, vol. 53, No. 10, 2007.

\* cited by examiner

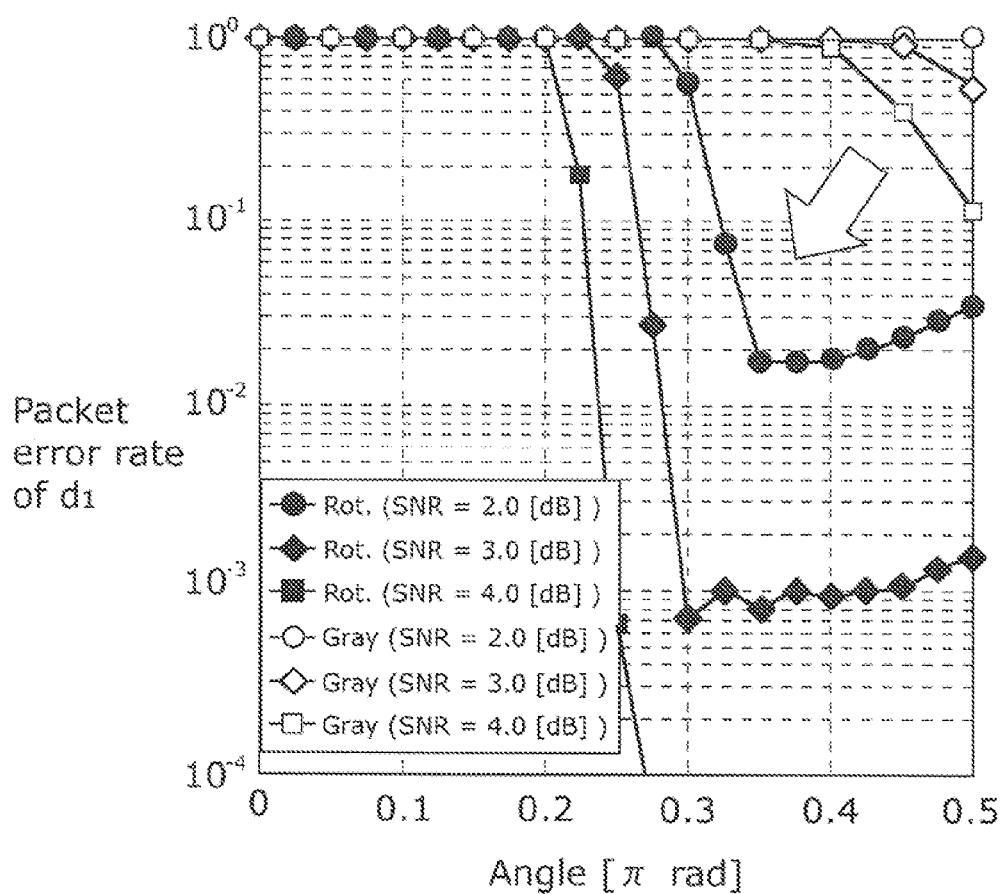

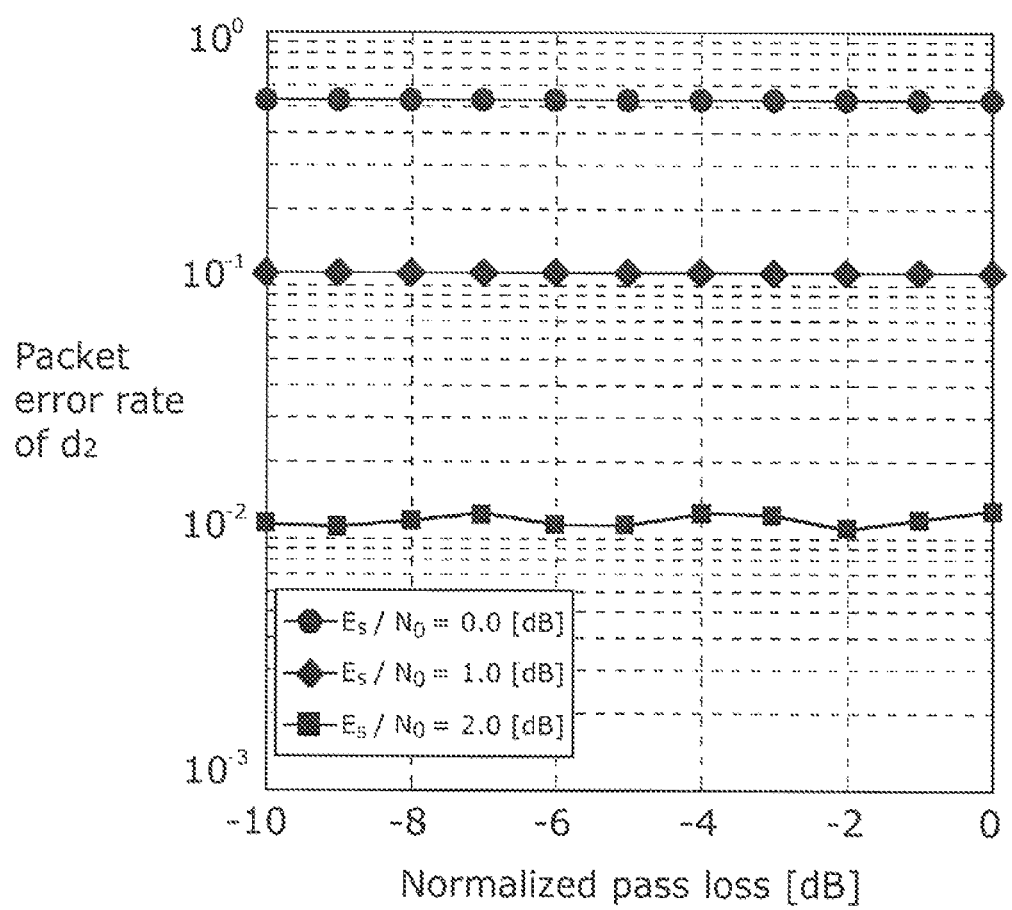

ically to a communication method of transmitting a signal generated by multiplexing a plurality of coded bit sequences, receiving the transmitted signal, and extracting the original coded bit sequences.

TRANSMISSION METHOD, RECEPTION METHOD, AND COMMUNICATION METHOD

TECHNICAL FIELD

The present invention relates to transmission methods, reception methods, and communication methods, and in particular to a communication method of transmitting a signal generated by multiplexing a plurality of coded bit sequences, receiving the transmitted signal, and extracting the original coded bit sequences.

BACKGROUND ART

Recent years have seen active study for approaches for increasing a throughput in a whole network in an environment for a wireless communication network in which multiple nodes are omnipresent, by allowing some of the multiple nodes in the network to perform cooperative communication with a destination node instead of using a form for causing each of the multiple nodes to perform direct and independent communication with the destination node.

A focus is placed on a multi-hop transmission for (i) establishing a cooperation relationship between multiple nodes by utilizing some of the multiple nodes present between information source nodes and a destination node in the case where the destination node is distant from the information source nodes and thus a received signal does not secure a sufficient power level, and (ii) reducing the decrease in the power level of the received signal due to a path loss. However, this multi-hop transmission has a disadvantage of requiring several times of transmission of packets including the same information within the network, although the multi-hop transmission makes it possible to increase the power level of the received signal.

With an aim to reduce the number of times of transmission within the network, an application is conceivable which is network coding for multiplexing a plurality of packets in the same radio resource (NPL (Non-patent Literatures) 1 and NPL 2). Another proposed approach is an approach for performing iterative signal detection based on turbo principle regarding network coding and channel coding as concatenated coding to combine a Log Likelihood Ratio (LLR) that is a soft decision value of a detected rate of transmission information, and obtaining a high diversity gain (NPL 3).

CITATION LIST

Non-Patent Literature

[NPL 1]
"Network information flow", pp. 1024-1216, R. Ahlswede, N. Cai, S.-Y. R. Li, and R. W. Yeung, IEEE Transaction Information Theory, Vol. 46, No. 4, July 2000
[NPL 2]
"Wireless diversity through network coding", pp. 1681-1686, Y. D. Chen, S. Kishore, and J. Li, in Proc. WCNC '06, Vol. 3, Las Vegas, Nev., USA, April 2006
[NPL 3]
"Joint design of network coding and channel decoding for wireless networks", pp. 779-784, S. L. Zhang, Y. Zhu, S. C. Liew, and K. B. Letaief, in Proc. WCNC '07, Hong Kong, March 2007

SUMMARY OF INVENTION

Technical Problem

However, the above-described conventional techniques entail the problems indicated below.

For example, in the case of applying the coding disclosed in NPL 1, a butterfly network configuration is required to establish an effective cooperation relationship. In addition, in the case of applying the coding disclosed in NPL 2, the power levels of the respective received signals that reach the address node must be equal to each other.

In this way, the above-described conventional techniques place inflexible constraints on network topologies that are prerequisites for these algorithms. For this reason, the above-described conventional techniques do not have enough applicability in real environments in which multiple nodes are located at random. Such constraints are unlikely to be satisfied in such environments in which multiple nodes are present at random.

The present invention does not require, as a constraint, a complex network topology as mentioned above because the present invention is applicable to a simple topology conceivable as a communication environment in which two information source node independently communicate with one destination node. The present invention has an object to provide a transmission method, a reception method, and a communication method in which an inter-nodes cooperation relationship that can provide a sufficient advantageous effect is established even in an environment in which there is a difference in the power levels of the respective received signals that reach the address node via two routes.

Solution to Problem

In order to solve the above-described problems of the conventional art, the transmission method according to the present invention is a transmission method which is (i) performed by a first transmission device and a second transmission device to transmit signals to a reception device which iteratively detects a log likelihood ratio in units of a pair of bits included in the respective signals at constellation points, the second transmission device being located closer to the reception device than the first transmission device, and (ii) includes: generating a first signal by modulating a first bit sequence, and transmitting the generated first signal to the second transmission device and the reception device, the generating and transmitting being performed by the first transmission device; receiving the first signal, and extracting the first bit sequence included in the received first signal, the receiving and extracting being performed by the second transmission device; generating a third bit sequence by performing, in units of a pair of bits, logical operation on the first bit sequence extracted in the receiving and extracting and a second bit sequence, the generating being performed by the second transmission device; and generating a second signal by modulating the third bit sequence, and transmitting the generated second signal to the reception device, the generating and transmitting being performed by the second transmission device.

In this way, it is possible to transmit first information (a first bit sequence) that should be transmitted by the first transmission device to the reception device via the second transmission device. At this time, the second transmission device performs logical operation on the first information and second information (a second bit sequence) that should be transmitted by the second transmission device itself. Thus the second transmission device can transmit the multiplexed two pieces of information without increasing the number of time slots. In addition, it is possible to reduce the power consumption compared to the case where the first transmission device independently transmits the first information to the reception device.

In addition, in the generating of the third bit sequence, the third bit sequence may be generated when an exclusive OR of the first bit sequence and the second bit sequence is calculated by the second transmission device in units of a pair of bits.

In addition, a reception method according to the present invention includes receiving a first signal that is a signal resulting from attenuation, during propagation, of a signal generated by modulating a first bit sequence, and demodulating the received first signal; receiving a second signal generated by modulating the third bit sequence generated by performing, in units of a pair of bits, logical operation on the first bit sequence and a second bit sequence, and demodulating the received second signal; and extracting the first bit sequence and the second bit sequence by iteratively calculating, in units of a pair of bits, reliability information indicating reliability of each pair of bits, using the first signal demodulated in the receiving and demodulating of the first signal and the second signal demodulated in the receiving and demodulating of the second signal.

In this way, it is possible to receive the second signal including the first bit sequence and the second bit sequence in an unreconstructable manner and the first signal including the first bit sequence as insufficient information, and reconstruct the first bit sequence and the second bit sequence. Such reconstruction is possible because each iterative LLR calculation increases the value of the resulting LLR that is reliability information.

In addition, in the extracting, the first bit sequence and the second bit sequence may be extracted by iteratively calculating a log likelihood ratio in units of a pair of bits included in the first signal and the second signal, the first signal and the second signal being assumed to correspond to one of Quadrature Phase Shift Keying (QPSK) signals arranged in a rectangle shape such that a real number component of the first signal is a real number component of the one of the QPSK signals and a real number component of the second signal is an imaginary number component of the QPSK signal.

In this way, when signals each of which is formed of two bits are arranged at constellation points in a rectangle shape in a complex plane, an accurate decoding of the second pair of bits of the signals at the constellation points yields, for the first pair of bits of the signals at the constellation points, an Euclidean distance that is longer than an Euclidean distance in the case of the second pair of bits. For this reason, it is possible to accurately reconstruct each pair of bits of the respective signals by performing the iterative LLR calculation. It is to be noted that an accurate decoding of the first pair of bits of the signals at the constellation points does not affect the Euclidean distance between the second pair of bits of the signals at the constellation points.

In addition, a communication method according to the present invention is performed by a plurality of communication devices to transmit and receive signals, and includes: generating a first signal by modulating a first bit sequence, and transmitting the generated first signal, the generating and transmitting being performed by a first transmission device that is one of the plurality of communication devices; receiving the first signal, and extracting the first bit sequence included in the received first signal, the receiving and extracting being performed by a second transmission device that is one of the plurality of communication devices; generating a third bit sequence by performing, in units of a pair of bits, logical operation on the first bit sequence extracted in the receiving and extracting and a second bit sequence, the generating being performed by the second transmission device; generating a second signal by modulating the third bit sequence, and transmitting the generated second signal, the generating and transmitting being performed by the second transmission device; receiving a third signal that is a signal generated from the first signal when the first signal attenuated during propagation, and demodulating the received third signal, the receiving and demodulating being performed by a reception device that is one of the plurality of communication devices; receiving the second signal, and demodulating the received second signal, the receiving and demodulating being performed by the reception device; and extracting the first bit sequence and the second bit sequence by iteratively calculating, in units of a pair of bits, reliability information indicating reliability of each pair of bits, using the third signal demodulated in the receiving and demodulating of the third signal and the second signal demodulated in the receiving and demodulating of the second signal, wherein the second transmission device is located closer to the reception device than the first transmission device.

In this way, it is possible to transmit the first information (first bit sequence) that should be transmitted by the first transmission device to the reception device via the second transmission device. At this time, the second transmission device performs logical operation on the first information and the second information (second bit sequence) that should be transmitted by the second transmission device itself. Thus the second transmission device can transmit the two pieces of information without increasing the number of time slots. Although the second signal includes the first bit sequence and the second bit sequence in an unreconstructable manner, the reception device can receive the second signal and the first signal including the first bit sequence as insufficient information, and thus can reconstruct the first bit sequence and the second bit sequence. Such reconstruction is possible because each iterative LLR calculation increases the accuracy of the resulting reliability information. In addition, it is possible to reduce the power consumption compared to the case where the first transmission device independently transmits the first information to the reception device.

In addition, a communication device that is located at a position at which a distance between the communication device and the reception device is shorter than a distance between the first transmission device and the reception device, and at which the distance is longer than a predetermined distance may be determined as the second transmission device, and the predetermined distance may be smaller when a signal to noise power ratio (SNR) of a signal received by the reception device is larger.

In this way, it is possible to select, as the second transmission device, a suitable one of the plurality of communication devices. Thus, there is no need to increase the number of time slots and to use savable power in the network.

In addition, a communication device that is located at a position at which a distance between the communication device and the reception device is longer than a distance between the first transmission device and the reception device, and at which the distance is shorter than a predetermined distance may be determined as the first transmission device, and the predetermined distance may be larger when a signal to noise power ratio (SNR) of a signal received by the reception device is larger.

In this way, it is possible to select, as the first transmission device, a suitable one of the plurality of communication devices. Thus, there is no need to increase the number of time slots and to use savable power in the network.

Advantageous Effects of Invention

The present invention does not require, as a constraint, a complex network topology, and is applicable to a simple topology conceivable as a communication environment in which two information source nodes independently communicate with one destination node. Furthermore, the present invention makes it possible to establish an inter-node cooperation relationship which can provide a sufficient advantageous effect even in an environment in which there is a difference in the power levels of the received signals that reach the address nodes via two routes.

BRIEF DESCRIPTION OF DRAWINGS

FIG. 3A is a diagram showing PER characteristics of an information bit sequence $d_1$.

FIG. 7B is a diagram showing PER characteristics of an information bit sequence $d_2$ in the conventional scenario 2.

DESCRIPTION OF EMBODIMENTS

Embodiment 1

Embodiment 1 describes a communication scheme used in a transmission method, a reception method, and a communication method according to the present invention.

The communication scheme in this embodiment is a communication scheme using signals (i) for which a log likelihood ratio between each pair of bits included in the received signals is iteratively detected at the time when the signals are received and (ii) for which the signals are arranged at the constellation points in a rectangle shape using natural binary coding. More specifically, transmission sides generate a QPSK signal using the natural binary coding by calculating an exclusive OR of the two bit sequences. On the other hand, a receiver side extracts the original two bit sequences by iteratively calculating the log likelihood ratio between each pair of bits included in the received QPSK signal.

According to the principle of the above communication scheme, the present invention does not require, as a constraint, a conventional complex network topology, and is applicable to a simple topology conceivable as a communication environment in which two information source nodes independently communicate with one destination node. Furthermore, the present invention makes it possible to establish an inter-node cooperation relationship which can provide a sufficient advantageous effect even in an environment in which there is a difference in the power levels of the received signals that reach the address nodes via two routes.

A point to be focused in establishing this cooperation relationship is that the LLR relationship of the received signals received via the two routes and having a difference in the power levels is equivalent to the LLR relationship of a corresponding one of the QPSK received signals arranged at constellation points in a rectangle shape. This fact suggests that the topic to be described below is the problem of detecting such a QPSK signal arranged in the rectangle shape.

In general, a gray-coded QPSK signal arranged in a square shape is considered to be transmitted with the highest transmission rate in terms of the minimum Euclidean distance between the constellation points. This is true in the case of not applying Bit Interleaved Coded Modulation-Iterative Detection (BICM-ID) which requires, as prerequisites, the use of a channel coding and the application of iterative signal detection, but is not always true in the case of applying the BICM-ID. This embodiment describes that the rectangle arrangement improves the convergence of signals in signal detection in the iterative processing, resulting in the increase in the signal detection accuracy.

Figure 1:
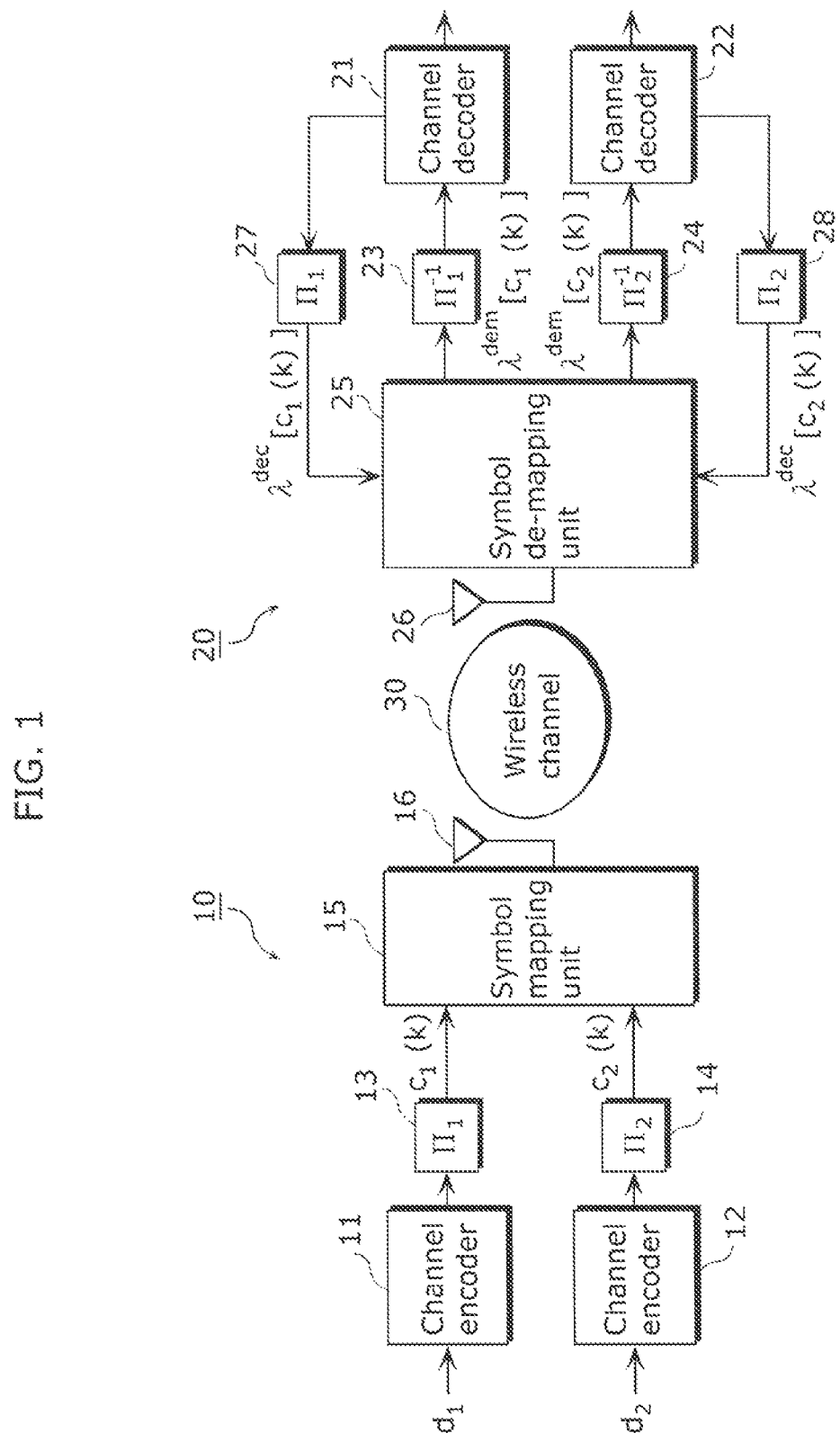
FIG. 1 is a block diagram showing examples of a structure of a transmitter and a structure of a receiver in Bit Interleaved Coded Modulation-Iterative Detection (BICM-ID) in Embodiment 1.

First, a description is given of how the arrangement of the constellation points of QPSK signals in the BICM-ID affects the transmission. FIG. 1 is a diagram showing a structure of a transmitter 10 and a structure of a receiver 20 in an equivalent baseband system representation.

As shown in FIG. 1, the transmitter 10 includes channel encoders 11 and 12, interleavers 13 and 14, a symbol mapping unit 15, and a transmission antenna 16. The receiver 20 includes channel decoders 21 and 22, de-interleavers 23 and 24, a symbol de-mapping unit 25, a reception antenna 26, and interleavers 27 and 28.

The following describes operations performed by the processing units of the transmitter 10.

Figure 2:
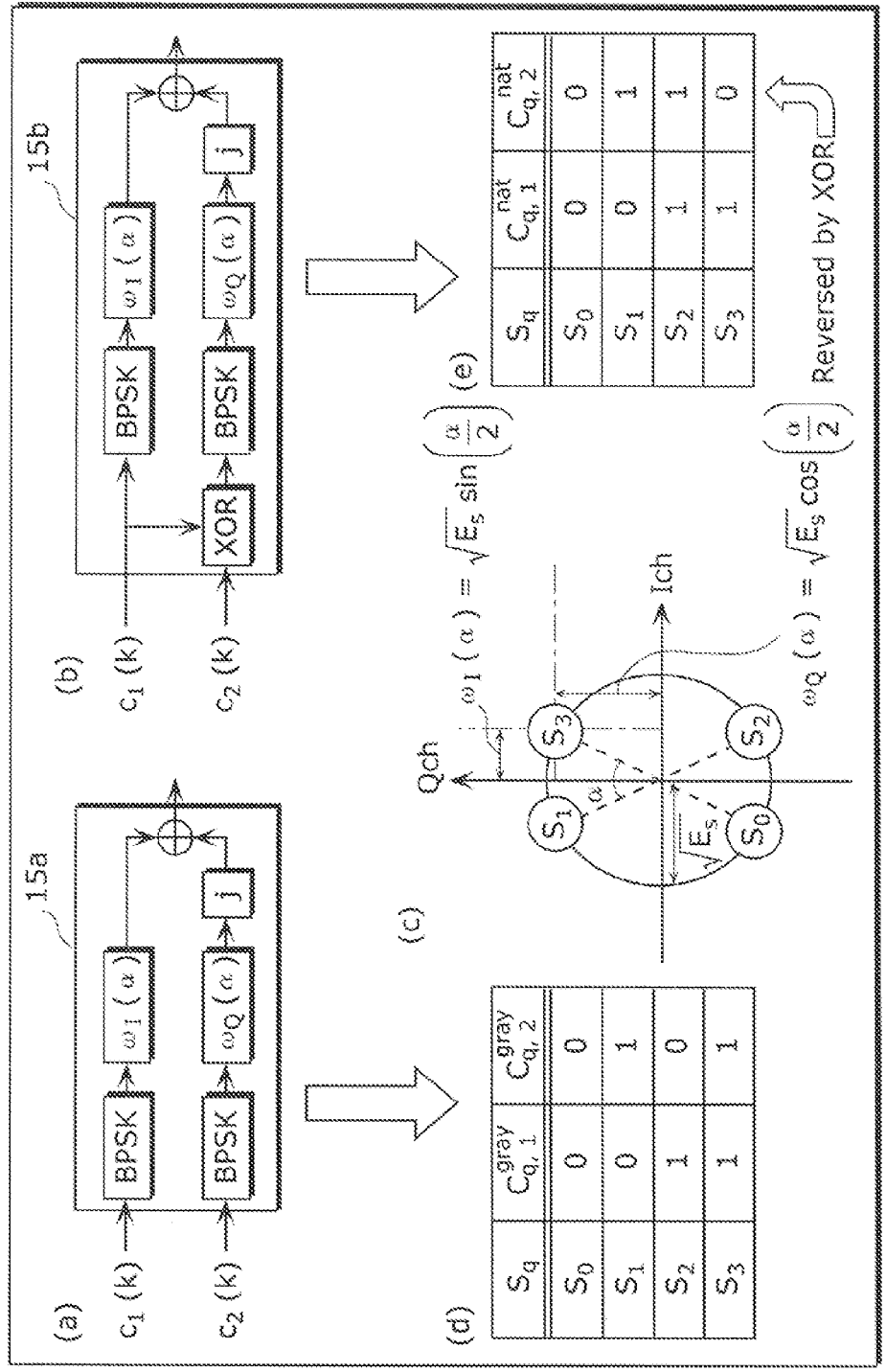
FIG. 2 is a diagram showing an arrangement rule for constellation points of QPSK signals.

First, the channel encoders 11 and 12 independently perform channel coding on information bit sequences $d_i$ (i=1, 2). The information bit sequences subjected to the channel coding are input respectively to the interleavers 13 and 14. Each of the interleavers 13 and 14 generates a coded bit sequence $c_i(k)$. The generated coded bit sequence $c_i(k)$ is input to the symbol mapping unit 15 that is a modulator. FIG. 2 shows an arrangement rule for constellation points of QPSK signals. Here, k denotes a discrete time index.

In this embodiment, the symbol mapping unit 15 is configured to perform natural binary coding. For comparison, another case where the symbol mapping unit 15 performs gray coding is also described.

In FIG. 2, (a) shows a structure of a symbol mapping unit 15a using the gray coding. As shown in (a) in FIG. 2, after BPSK (Binary PSK) baseband signals are generated by $c_i(k)$, the equivalent baseband signals are weighted by coefficients $\omega_1(\alpha)$ and $\omega_0(\alpha)$ to be transmission symbols as a same phase component and a quadrature component.

On the other hand, (b) in FIG. 2 shows a structure of a symbol mapping unit 15b using the natural binary coding. As shown in (b) in FIG. 2, the same phase component is generated from $c_1$ (k) as in the case of the symbol mapping unit 15a ((a) in FIG. 2), but the quadrature component is generated by calculating an exclusive OR of $c_1$ (k) and $c_2$ (k).

In addition, in the case of using the natural binary coding as shown in (b) in FIG. 2, the maximum value of the Hamming distance from the adjacent symbol is 2. On the other hand, in the case of using the gray coding as shown in (a) in FIG. 2, the Hamming distance from the adjacent symbol is always 1. For this reason, the gray coding has been conventionally employed in many systems.

However, according to another aspect of the natural binary coding, a constellation point as in the gray coding is applied to the same phase component, but the exclusive OR of the bits respectively assigned to the same phase component and the quadrature component in the gray coding is assigned to the quadrature component. In addition, the exclusive OR is considered as coding between the two bits. Naturally, appropriate decoding contributes an increase in the coding gain.

In addition, (c) in FIG. 2 is a complex plan view showing an example of a rectangle arrangement of constellation points. As shown in (c) in FIG. 2, unlike the conventional gray coding, the natural binary coding allows a rectangle arrangement of constellation points with respect to constellation point angle α [rad]. In this case, the weighted coefficients of the same phase component and the quadrature component are given according to Expression 1.

[Math. 1]

$$\omega_I(\alpha) = \sqrt{E_S} \sin\left(\frac{\alpha}{2}\right), \omega_Q(\alpha) = \sqrt{E_S} \cos\left(\frac{\alpha}{2}\right)$$ (Expression 1)

Here, Es denotes energy per symbol.

Each of (d) and (e) in FIG. 2 shows an arrangement rule for constellation points in the case where the gray coding and the natural binary coding are used. According to the arrangement rule as shown in each of the diagrams, four constellation points $S_q$ (q=0, ..., 3) are arranged.

As shown in (d) in FIG. 2, in the gray coding, $S_q$ is assumed to be a transmission symbol when $c_1$ (k) and $c_2$ (k) match with $C_{q,1}^{gray}$ and, $C_{q,2}^{gray}$, respectively. On the other hand, as shown in (e) in FIG. 2, in the natural binary coding, $S_q$ is assumed to be a transmission symbol when $c_1$ (k) and $c_2$ (k) match with $C_{q,1}^{nat}$ and, $C_{q,2}^{nat}$, respectively.

As shown in (b) in FIG. 2, since the natural binary coding involves the exclusive OR calculation, the transmission signal including the transmission symbol s (k) generated as described above is transmitted to the receiver 20 via the wireless channel 30 from the transmission antenna 16 and is received by the reception antenna 26.

The following describes operations performed by the processing units of the receiver 20.

Here, assuming that the wireless channel 30 is an Additive White Gaussian Noise (AWGN) channel, a received symbol r (k) is given according to Expression 2.

[Math. 2]

$$r(k)=s(k)+v(k)$$ (Expression 2)

Here, v (k) denotes a Gaussian noise component having an average 0 and a complex dispersion $N_0$.

The receiver 20 executes iterative detection. More specifically, in the iterative detection, the accuracy in the bit detection is increased by allowing a demodulator (symbol de-mapping unit 25) having a Soft-input Soft-output (SfiSfo) function and each of decoders (channel decoders 21 and 22) to exchange extrinsic Log likelihood ratios (LLRs) calculated thereby. Here, a log likelihood ratio is one of pieces of information each indicating the reliability of a bit.

The demodulator (symbol de-mapping unit 25) calculates a priori probability Pr [s (k)=Sq] of a symbol, based on the extrinsic LLRs fed back from outputs by the respective channel decoders 21 and 22 and shown by Expression 3.

[Math. 3]

$$\lambda^{dec}[c_i(k)] = \ln\frac{Pr[c_i(k) = 1]}{Pr[c_i(k) = 0]}$$ (Expression 3)

[Math. 4]

$$Pr[s(k) = S_q] = \prod_{i=1}^{2} Pr[c_i(k) = C_{q,i}]$$ (Expression 4)

Here, $C_{q,1}$ that is an element of $\{0, 1\}$ is $C_{q,i}^{gray}$ in the gray coding but $C_{q,i}^{nat}$ in the natural binary coding, and the priori probability Pr $[C_i$ (k)=$C_{q,i}$ is given according to Expression 5.

[Math. 5]

$$Pr[c_i(k) = C_{q,i}] = \frac{1}{2}\left[1 + (2C_{q,i} - 1)\tanh\left(\frac{\lambda^{dec}[c_i(k)]}{2}\right)\right]$$ (Expression 5)

In the iterative signal detection, marginalization according to Expression 6 by utilizing the priori probability of the symbol given according to Expression 4 gives the posteriori probability Pr $[C_i$ (k)|r (k)].

[Math. 6]

$$Pr[c_i(k) | r(k)] \propto \sum_{S_q \in \{S|C_{q,i}=c_1(k)\}} p(r(k)|S_q)Pr[s(k) = S_q]$$ (Expression 6)

Since the AWGN channel is used, a conditional probability density function p (r (k)|$S_q$) is given according to Expression 7. It is to be noted that the present invention is not limited to the AWGN channel, and is applicable to any other channel by assigning an appropriate probability density function.

[Math. 7]

$$p(r(k)|S_q) = \frac{1}{\pi N_0}\exp\left(-\frac{|r(k) - S_q|^2}{N_0}\right)$$ (Expression 7)

The extrinsic LLR: $\lambda^{dem}$ $[c_i$ (k)] output by demodulator (symbol de-mapping unit 25) is defined by Expression 8 based on Expression 6.

[Math. 8]

$$\lambda^{dem}[c_i(k)] = \ln\frac{Pr[r(k)|c_i(k)=1]}{Pr[r(k)|c_i(k)=0]} \quad \text{(Expression 8)}$$
$$= \ln\frac{Pr[c_i(k)=1|r(k)]}{Pr[c_i(k)=0|r(k)]} - \lambda^{dec}[c_i(k)]$$

Here, substituting the complex symbol $S_q$ in each of the gray-coded QPSK signals as shown in (d) in FIG. 2 in Expression 3 to Expression 6, Expression 8 is simplified into Expression 9 and Expression 10.

[Math. 9]

$$\lambda^{dem}[c_1(k)] = \frac{4\omega_I(\alpha)}{N_0}\text{Re}[r(k)] \quad \text{(Expression 9)}$$

[Math. 10]

$$\lambda^{dem}[c_2(k)] = \frac{4\omega_Q(\alpha)}{N_0}\text{Im}[r(k)] \quad \text{(Expression 10)}$$

However, Re [x] and Im [x] denotes the real number and the imaginary number of the complex number x, respectively.

Looking at Expression 9 and Expression 10, the left terms of Expressions 9 and 10 are independent from the extrinsic LLR: $\lambda^{dec}$ [$c_i$ (k)] fed back from the respective channel decoders 21 and 22. This suggests that the extrinsic LLR: $\lambda^{dec}$ [$c_i$ (k)] fed back from each of the channel decoders 21 and 22 does not function as the priori information for the symbol probability Pr [s (k)=Sq] in Expression 6 even when iterative signal processing is utilized.

On the other hand, in the natural binary coding, it is possible to actively utilize the priori information based on Expression 6, and thus to enjoy the advantage of the iterative signal processing.

Next, each of the extrinsic LLRs: $\lambda^{dem}$ [$c_i$ (k)] calculated by the demodulator (symbol de-mapping unit 25) is input as channel information to the corresponding one of the channel decoders 21 and 22 via the corresponding one of the de-interleavers 23 and 24. Each of the channel decoders 21 and 22 calculates the posteriori probability of the de-interleaved coded bit, the posteriori probability is interleaved by a corresponding one of the interleavers 27 and 28, and then the extrinsic LLR: $\lambda^{dec}$ [$c_i$ (k)] according to Expression 3 is generated. Here, the extrinsic LLR (log likelihood ratio) is one of the pieces of information each indicating the reliability of a bit.

[Math. 11]

$$\lambda^{dec}[c_i(k)] = \ln\frac{Pr[c_i(k)=1]}{Pr[c_i(k)=0]} \quad \text{(Expression 11)}$$
$$= \ln\frac{Pr[c_i(k)=1|r(k)]}{Pr[c_i(k)=0|r(k)]} - \lambda^{dem}[c_i(k)]$$

An iteration of the sequential processes monotonously increases the reliability as shown by each extrinsic LLR. Lastly, each of the channel decoders 21 and 22 calculates the posteriori probability of information bit, and determines the transmission bit.

For the evaluation of the characteristics of the BICM-ID described above, a computer simulation was performed. The following Table 1 shows various elements of the simulation.

TABLE 1

| | |
|---|---|
| Modulation scheme | QPSK |
| | (Gray coding or Natural binary coding) |
| Channel coding | Non-systematic convolution |
| | (Coding rate ½) |
| | (Constraint length = 4) |
| Decoder | Max-Log-MAP |
| | with Jacobian logarithm |
| Packet length | 1024 symbols per packet |
| Interleaver | Random |
| Channel model | AWGN |
| Number of iterations | ⅛ |
| | (Gray coding or Natural binary coding) |

Figure 3B:
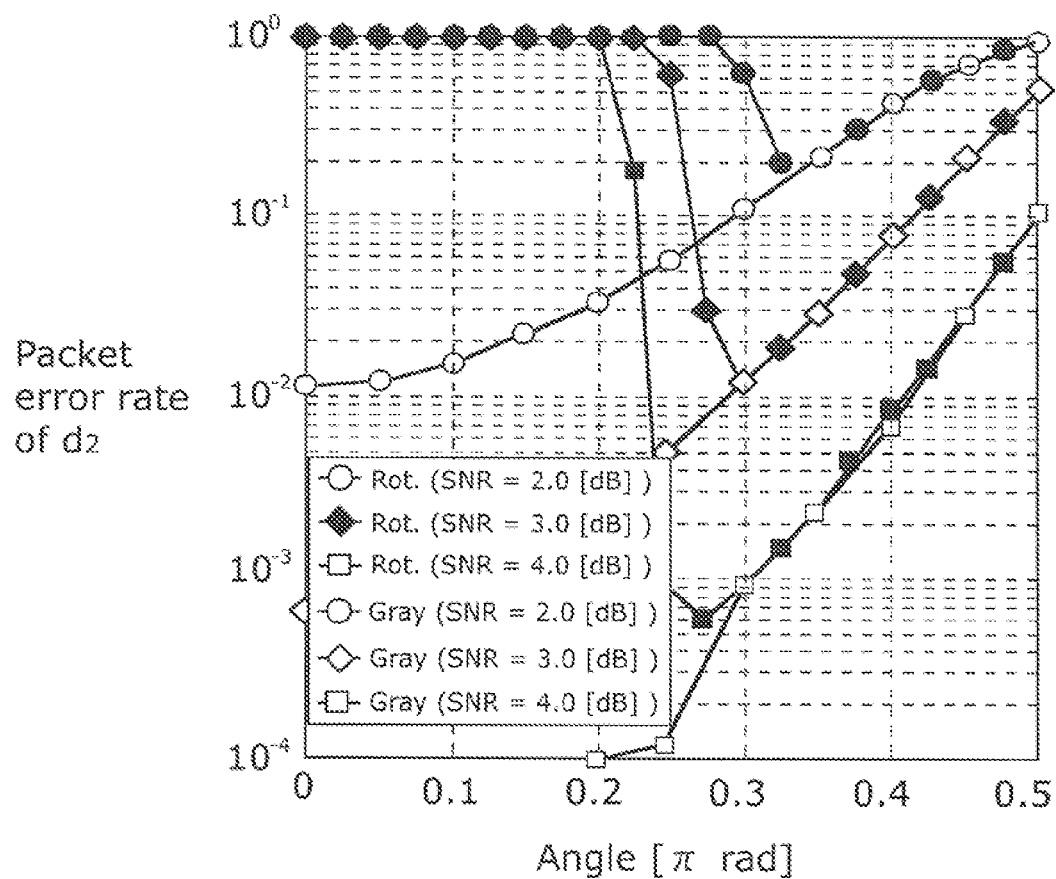
FIG. 3B is a diagram showing PER characteristics of an information bit sequence $d_2$.

As shown in Table 1, each of the channel encoders 11 and 12 generates codeword of 1024 bits per packet by performing non-systematic convolution coding of a coding rate ½ and a constraint length of 4, and each of the channel decoders 21 and 22 performs decoding using the Max-Log-MAP with a correction term. In addition, the number of times of iterative signal processing performed within the receiver 20 is 1 in the case of the gray coding and 8 in the case of the natural binary coding. Each of FIGS. 3A and 3B shows the Packet Error Rate (PER) with respect to a corresponding one of information bit sequences $d_1$ and $d_2$. FIG. 3A is a diagram showing PER characteristics of an information bit sequence $d_1$. FIG. 3B is a diagram showing PER characteristics of an information bit sequence $d_2$. In each of the diagram, the angle of the horizontal axis is an angle α as shown in (c) in FIG. 2, that is the angle between two symbols having the origin as their center point. Here, the two symbols are two symbols that form the shorter sides of a rectangle among the four symbols arranged to define the rectangle.

First, looking at the PER characteristics in the gray coding in each of the diagram, a difference is observed in the PER between a packet of $d_1$ and a packet of $d_2$ when the angle is small, due to the difference in the Euclidean distance between the quadrature component and the same phase component in the rectangle arrangement of the constellation points. In particular, when the angle is 0 [rad], the component of the packet of $d_1$ is 0, and the whole symbol energy is the BPSK signal assigned to the packet of $d_2$. When the angle α is increased, the energy assigned to the packet of $d_2$ is distributed to the packet of $d_1$. This degrades the detection accuracy for $d_2$, but improves the PER of $d_1$. In particular, the constellation points are arranged in a square shape using the gray coding when the angle α is 0.5 n [rad]. In this case, $d_1$ and $d_2$ have the same PER value, and provide the most excellent characteristics as a whole.

On the other hand, in the case of the natural binary coding, the detection accuracy for $d_1$ is bad when the angle α is small. In this case, a quadrature component signal multiplexed by exclusive OR is separated with ambiguity, thus the PER characteristics of the both are extremely bad. However, setting the angle α to approximately 0.25π [rad] makes it possible to resolve the ambiguity problem utilizing the iterative signal detection. Furthermore, when the angle α is increased up to a predetermined threshold value, an error floor occurs in the PER of $d_1$ and the PER characteristics of d2 deteriorates due to the decrease in the energy of the quadrature component.

In this way, it is clearly shown that, in the BICM-ID by the natural binary coding, the use of the constellation points arranged in a rectangle shape makes it possible to perform exclusive OR operation and iterative signal processing on the quadrature component, and thus to increase the newly obtainable coding gain to the maximum, and that it is possible to obtain the transmission characteristics more excellent than the case of the gray-coded QPSK signal.

Embodiment 2

In the communication system in this embodiment, a relay device (second transmission device) receives a first signal transmitted from a transmission device (first transmission device) to a reception device, and the relay device performs logical operation on first information (a first bit sequence) included in the received signal and second information (a second bit sequence) that should be transmitted by the relay device itself. Next, the relay device transmits third information (a third bit sequence) generated by the logical operation as the second signal to the reception device. The reception device receives the two signals (first signal and second signal) having mutually different power levels. Assuming that the received signals are QPSK signals arranged at constellation points in a rectangle shape, the reception device reconstructs the first information and the second information from the two signals according to the communication scheme as shown in Embodiment 1.

A detailed description is given of an environment in which transmission nodes $U_1$ and $U_2$ of two users transmit information of information bit sequences $d_1$ and $d_2$ to a destination node D. Here, it is assumed that the relationship of [the distance between $U_1$ and D]≥[the distance between $U_2$ and D] is satisfied ($U_2$ is located closer to D than $U_1$), and that the power levels are inevitably different from each other according to the distance difference. For simplification, it is assumed that the communication between $U_1$ and $U_2$ can be completely established.

Figure 4:
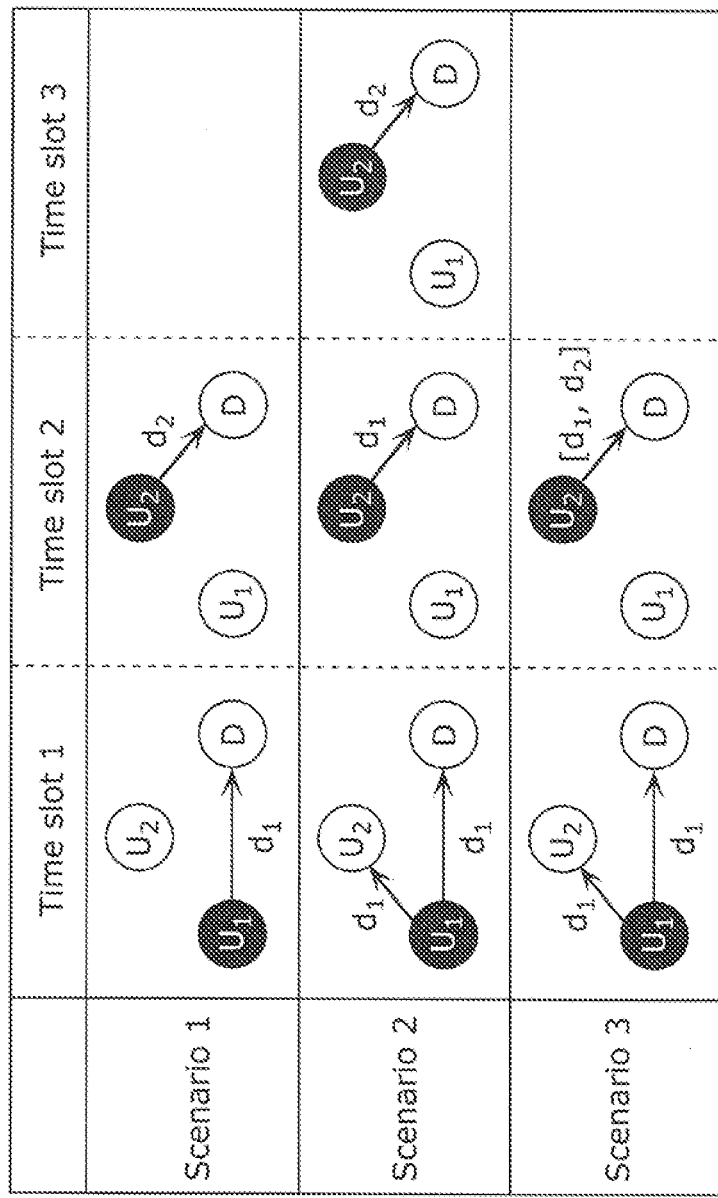
FIG. 4 is a diagram showing an example of a transmission scenario in a multiple user environment in Embodiment 2.

FIG. 4 shows three conceivable scenarios as representative transmission scenarios in such an environment. The transmission schemes and problems of the three scenarios are indicated below.

(Scenario 1)

Method: $U_1$ and $U_2$ use mutually different time slots, and transmit $d_1$ and $d_2$ in time division.

Problem: The transmission quality of $d_1$ is worse than that of $d_2$ due to a distance difference constraint.

(Scenario 2)

Method: In order to enhance the transmission quality of $U_1$, $U_2$ relay transmits an information bit sequence $d_1$ of $U_1$.

Problem: The number of time slots required for the transmission by the two users increases to 3 slots.

(Scenario 3)

Method: In order to prevent such an increase in the number of time slots, $U_2$ transmits a signal obtained by multiplexing information sequences $d_1$ and $d_2$.

Problem: The received SNR required for accurate signal detection increases due to the transmission of the multiplexed data.

In the scenarios 1 and 2, it is easy to check the transmission quality with consideration of the decrease in the received SNR affected by the path loss.

For example, in order to perform transmission in the scenario 1, the transmission power of a signal from $U_1$ must be increased. More specifically, in order to maintain the same transmission quality, when the transmission distance is doubled, the transmission power must correspond to the value obtained by multiplying 2 by 2 to 3 times. In this way, the power efficiency is bad in the case of the transmission in the scenario 1, and thus the scenario 1 is not preferable today in which energy should be saved.

In addition, in the case of the transmission in the scenario 2, the number of necessary time slots increases to 3 as mentioned above. In other words, the same information must be transmitted twice in total in time slots 1 and 2 in the network. In this way, in the case of the transmission in the scenario 2, such a problem arises that the network resource is used unnecessarily due to the increase in the number of transmission times.

Accordingly, focusing on the scenario 3, this embodiment solves the problem of a decrease in the signal detection accuracy due to the multiplex transmission by utilizing the knowledge about BICM-ID obtained in Embodiment 1.

Figure 5:
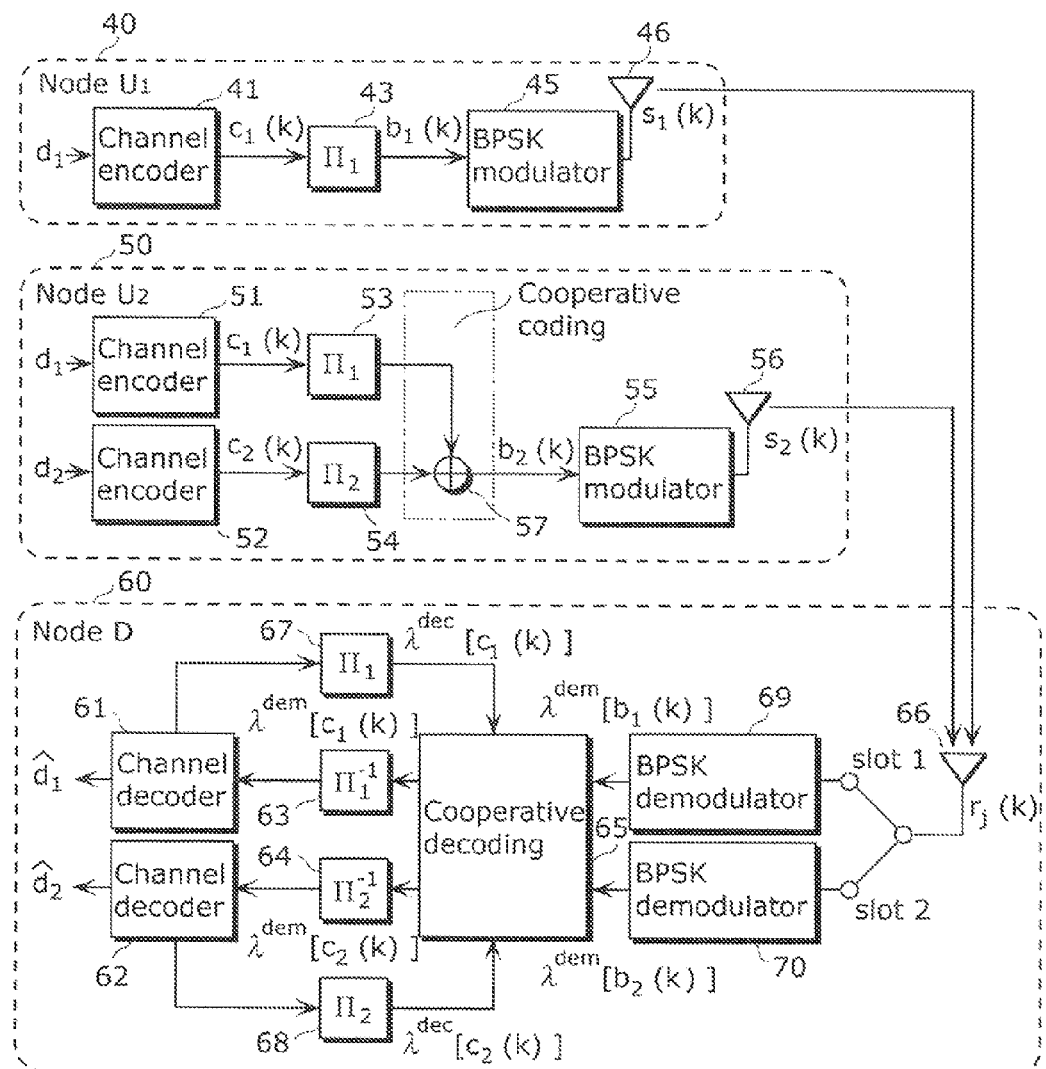
FIG. 5 is a block diagram showing an example of a structure of a transmitter and a structure of a receiver using a cooperative coding relay scheme in Embodiment 2.

FIG. 5 is a block diagram showing a structure of the communication system in this embodiment. The communication system as shown in the diagram includes a node $U_1$ 40 that is an example of the first transmission device, a node $U_2$ 50 that is an example of the second transmission device, and a node D 60 that is an example of the reception device.

At a discrete time k, when the transmission symbols of $U_1$ and $U_2$ are $s_1(k)$ and $s_2(k)$ and the received symbols in the time slots 1 and 2 are $r_1(k)$ and $r_2(k)$, the signal models in the equivalent baseband system in the scenario 3 are given according to Expression 12 and Expression 13.

[Math. 12]

$$r_1(k)=\sqrt{g}s_1(k)+v_1(k) \quad \text{(Expression 12)}$$

[Math. 13]

$$r_2(k)=s_2(k)+v_2(k) \quad \text{(Expression 13)}$$

Here, each of $v_1(k)$ and $v_2(k)$ denotes a Gaussian noise component having an average 0 and a complex dispersion $N_0$. In addition, g denotes the difference in the received power levels due to the distance difference, that is, the path loss of a signal communicated between $U_1$ and D normalized by the path loss of a signal communicated between $U_2$ and D. In other words, the signal $r_1(k)$ is a signal that: originates from a signal generated at the node $U_1$ 40; and is attenuated during its propagation; is normalized at a signal power level of a signal generated at the node $U_2$ 50 and then attenuated during its propagation; and includes noise added thereto.

Here, $s_i(k)$ is assumed to be a BPSK signal. In this case, $s_1(k)$ and $s_2(k)$ are transmitted at different time phase.

[Math. 14]

$$s(k)=s_1(k)+js_2(k) \quad \text{(Expression 14)}$$

Thus, the receiver regards the independently received signals as symbols virtually transmitted at the same timing as a same phase component and a quadrature component and also as signals according to the following expression, and thereby being able to regard the received signals as signal models in the case where QPSK signals arranged at constellation points in a rectangle shape are transmitted.

[Math. 15]

$$r(k)=Re[r_1(k)]+jRe[r_2(k)] \quad \text{(Expression 15)}$$

In other words, in a node D, the first signal ($r_1(k)$) and the second signal ($r_2(k)$) are regarded as being a corresponding one of the QPSK signals arranged at constellation points in a rectangle shape in which the real number component of the first signal is the real number component of the corresponding QPSK signal and the real number component of the second signal is the imaginary number component of the corresponding QPSK signal.

Here, the distance between a node $U_1$ 40 and a node D 60 is longer than the distance between a node $U_2$ 50 and the node D 60. Thus, the real number component of the first signal is smaller than the real number component of the second signal due to the path loss of the signals. For this reason, the first signal and the second signal received by the node D 60 can be regarded as one of the QPSK signals arranged in the rectangle shape according to Expression 15.

More specifically, in the node $U_1$ 40, the channel encoder 41 performs channel coding on $d_1$, and the BPSK modulator 45 performs BPSK modulation on a coded bit sequence $b_1$ (k) via the interleaver 43. Next, the transmission antenna 46 transmits, as the transmission symbol $s_1$ (k), the result of the modulation by the BPSK modulator 45 to the node $U_2$ 50 and the node D 60.

In addition, in the node $U_2$ 50, the channel encoders 51 and 52 perform channel coding on $d_1$ and $d_2$, respectively, and the exclusive OR calculation unit 57 outputs a coded bit sequence $b_2$ (k) that is a bit sequence obtained by the exclusive OR of the coded bits via the interleavers 53 and 54. Furthermore, the BPSK modulator 55 performs BPSK modulation on the coded bit sequence $b_2$ (k). Next, the transmission antenna 56 transmits, as the transmission symbol $s_2$ (k), the result of the modulation by the BPSK modulator 45 to the node D 60.

In this way, it is possible to configure a system having the above-described structure equivalent to that of the transmitter as described in Embodiment 1. Here, $d_1$ that is one of inputs of the node $U_2$ 50 is information received from the node $U_1$ 40 and to be transmitted to the node D 60. Here, it is assumed that the node $U_2$ 50 is located sufficiently close to the node $U_1$ 40, and that $d_1$ is successfully received by the node $U_2$ 50.

The node D 60 that is the receiver has a unique structural feature that performs decoding regarding transmission signals from the node $U_1$ 40 and the node $U_2$ 50 as a single parallel-concatenated cooperative code. In the node D 60, received symbols $r_1$ (k) and $r_2$ (k) having mutually different received power are received by the reception antenna 66, and then respectively input to the BPSK demodulators 69 and 70 each having an SfiSfo function. The BPSK demodulators 69 and 70 calculate extrinsic LLRs as shown in Expression 16.

[Math. 16]

$$\lambda^{dem}[b_j(k)] = \frac{p(r_j(k)|b_j(k)=1)}{p(r_j(k)|b_j(k)=0)}, (j=1,2) \quad \text{(Expression 16)}$$

When BPSK modulation is already performed, the extrinsic LLRs are given according to simplified expressions such as Expression 17 and Expression 18. However, in the case of any other modulation scheme, Expression 16 is directly used.

[Math. 17]

$$\lambda^{dem}[b_1(k)] = \frac{4\sqrt{g}}{N_0}\text{Re}[r_1(k)] \quad \text{(Expression 17)}$$

[Math. 18]

$$\lambda^{dem}[b_2(k)] = \frac{4}{N_0}\text{Re}[r_2(k)] \quad \text{(Expression 18)}$$

Here, as shown in Expression 15, considering that $r_1$ (k) and $r_2$ (k) have a quadrature relationship, that is a gray coding relationship, the probability density function p (r (k)|s (k)=$S_q$) of r (k) provided having a condition by the transmission symbol in Expression 6 is given according to Expression 19.

[Math. 19]

$$p(r(k)|s(k)=S_q) = \prod_{j=1}^{2} p(r_j(k)|b_j(k)=C_{q,j}^{gray}) \quad \text{(Expression 19)}$$

Here, the relationship in Expression 20 is satisfied.

[Math. 20]

$$p[r(k)|b_j(k)=C_{q,j}^{gray}] = \quad \text{(Expression 20)}$$
$$\frac{1}{2}\left[1 + (2C_{q,j}^{gray}-1)\tanh\left(\frac{\lambda^{dem}[b_i(k)]}{2}\right)\right]$$

On the other hand, at the node $U_2$ 50, cooperative coding is structured in the same manner as natural binary coding, in other words, exclusive OR operation is performed. Accordingly, when Pr [s (k)=$S_q$] in Expression 4 is calculated, $C_{q,i}$ is $C_{q,i}^{nat}$. Marginalization according to Expression 6 is performed using this symbol probability Pr [s (k)=$S_q$] and the probability density function given according to Expression 19. Furthermore, performing the iterative signal processing as described in Embodiment 1 makes it possible to achieve a high transmission rate even in an environment in which there is a difference in the received power levels.

More specifically, the channel decoders 61 and 62, the de-interleavers 63 and 64, the interleavers 67 and 68, the cooperative decoder 65 as shown in FIG. 5 respectively correspond to the channel decoders 21 and 22, the de-interleavers 23 and 24, the interleavers 27 and 28, and the symbol de-mapping unit 25 as shown in FIG. 1.

A computer simulation was performed in order to check the effectiveness of the cooperative coding relay scheme as described in this embodiment. The modulation scheme in each of the nodes is BPSK, and the other simulation elements are the same as those in Table 1. Each of FIG. 6A, FIG. 6B, FIG. 7A, FIG. 7B, FIG. 8A, and FIG. 8B shows, for a corresponding one of SNRs as shown in the legend, the PER characteristics of information bit sequences $d_1$ and $d_2$ with respect to the received power level difference (normalized path loss) g in a corresponding one of the scenarios. Here, the SNR in the legend is defined as the received SNR between $U_2$ and D.

Figure 6A:
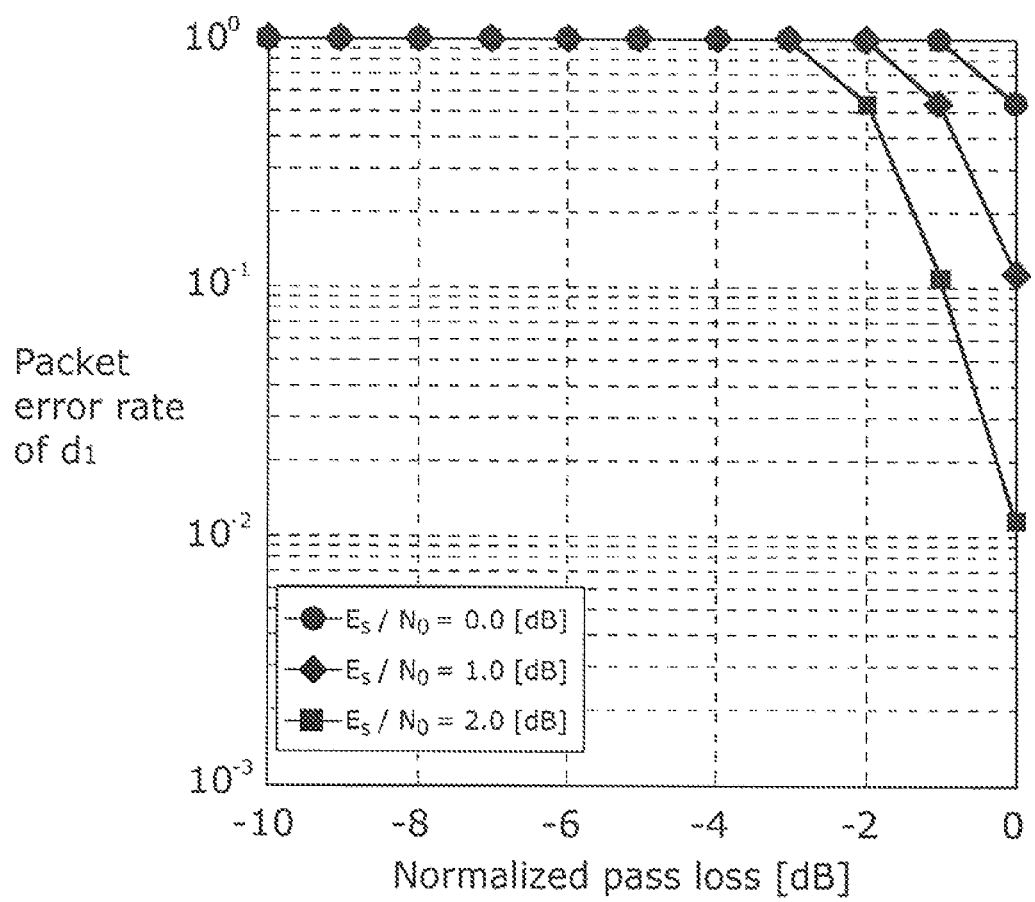
FIG. 6A is a diagram showing PER characteristics of an information bit sequence $d_1$ in a conventional scenario 1.
Figure 6B:
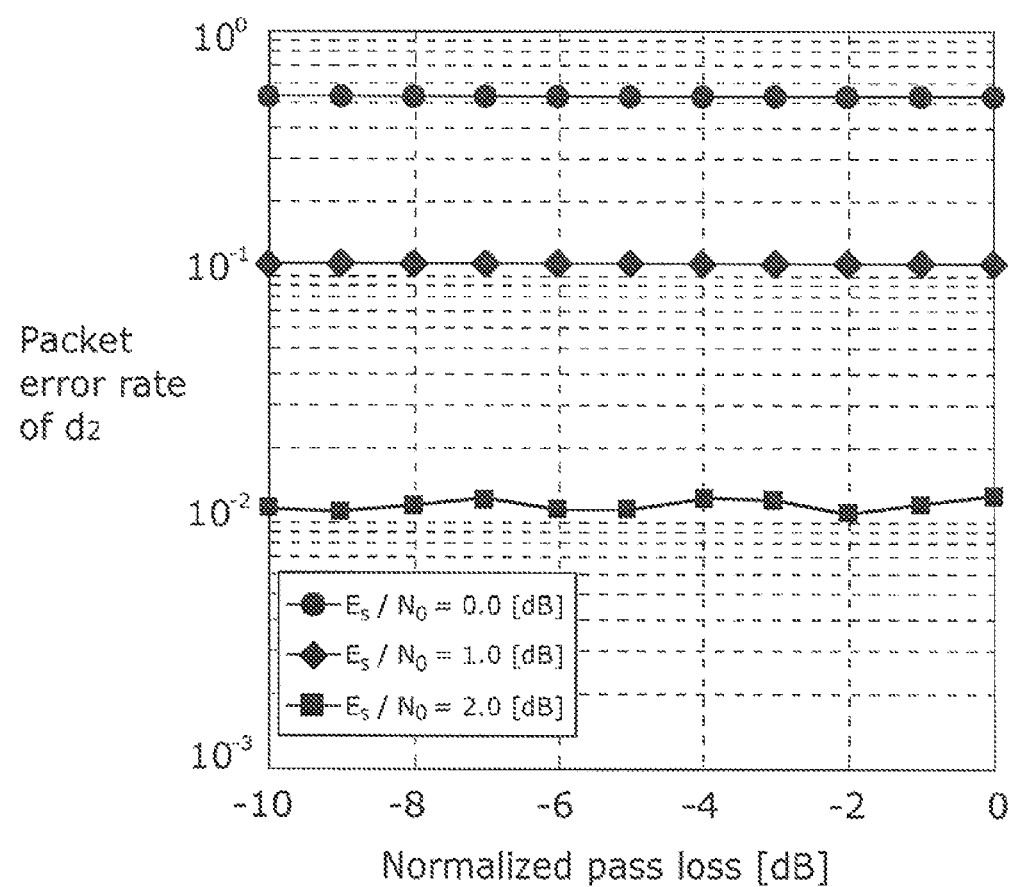
FIG. 6B is a diagram showing PER characteristics of an information bit sequence $d_2$ in the conventional scenario 1.

Each of FIG. 6A and FIG. 6B shows the PER characteristics in the conventional scenario 1. In this case, since $U_1$ is located distant from D than $U_2$, the detection accuracy of the characteristics of $d_1$ inevitably decreases according to the power difference due to the distance difference, as shown in FIG. 6A.

Figure 7A:
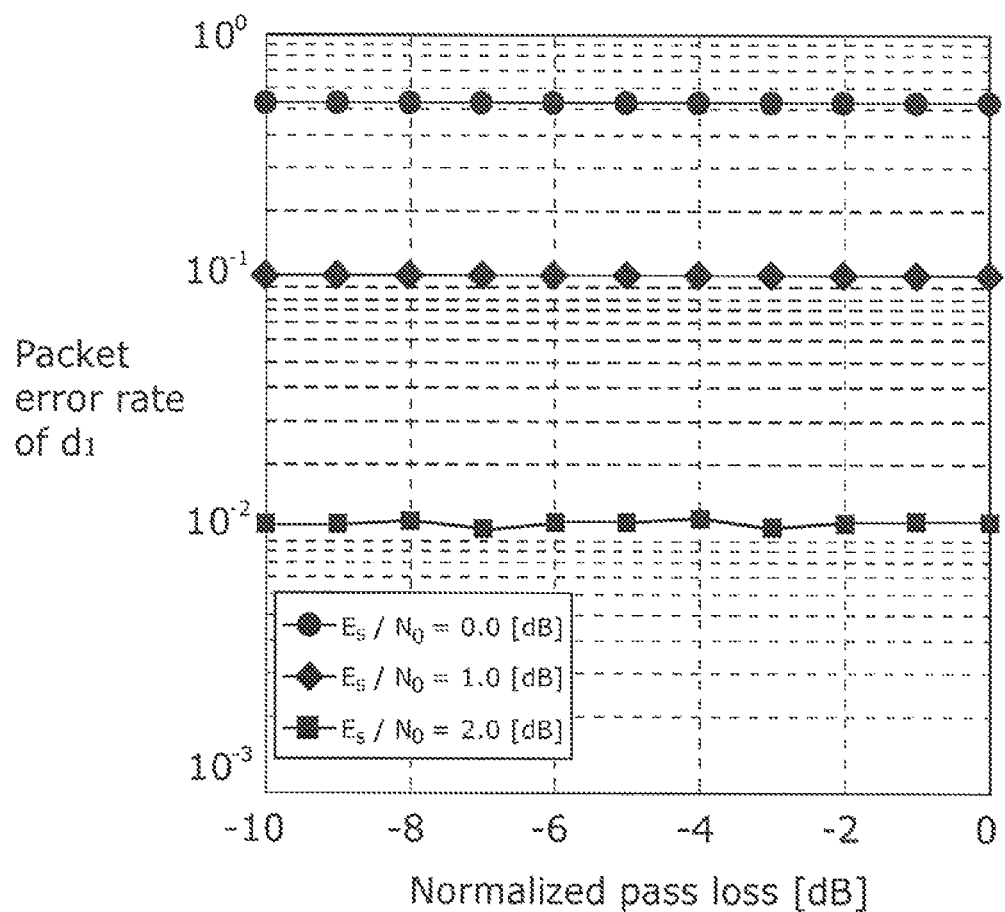
FIG. 7A is a diagram showing PER characteristics of an information bit sequence $d_1$ in a conventional scenario 2.

Each of FIG. 7A and FIG. 7B shows the PER characteristics in the conventional scenario 2. In this case, the PER of $d_1$ and the PER of $d_2$ are the same as shown in FIG. 7A and FIG. 7B because the PERs are dependent only on the communication environment between $U_2$ and D. However, the scenario 2 has the earlier-mentioned disadvantage of increase in the number of required time slots.

Figure 8A:
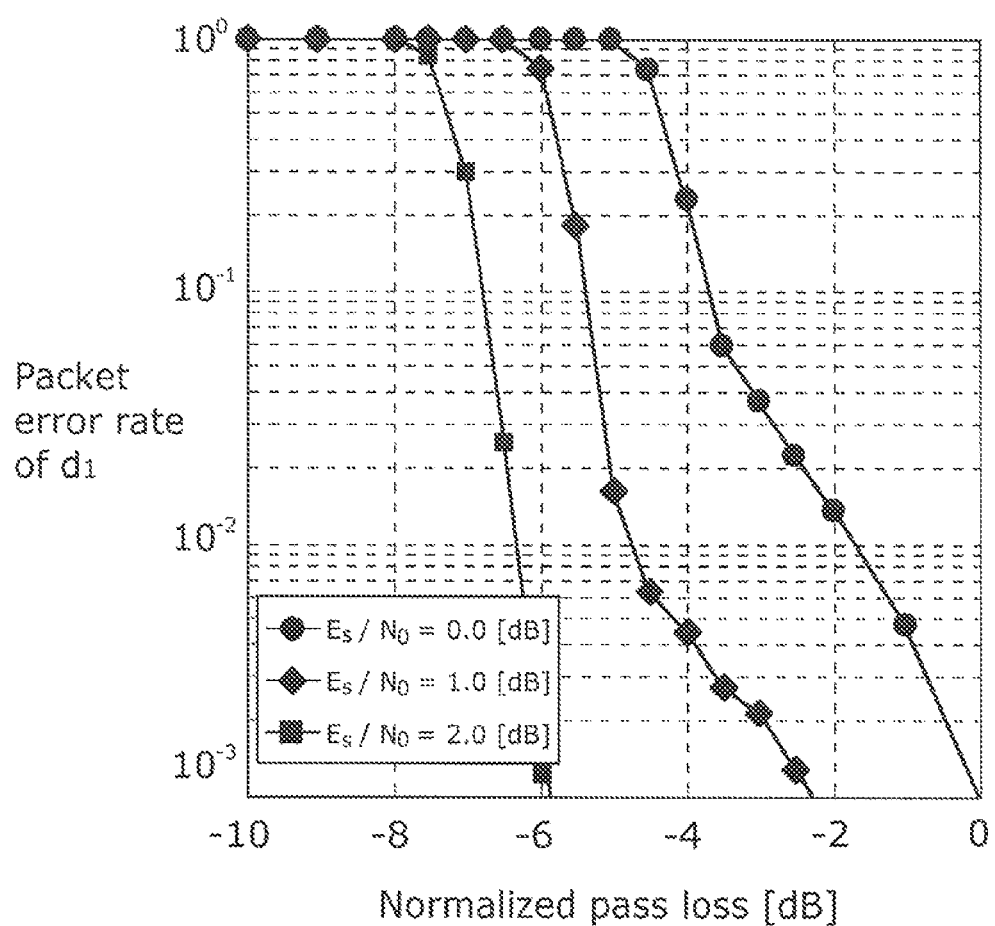
FIG. 8A is a diagram showing PER characteristics of an information bit sequence $d_1$ in a scenario 3 according to Embodiment 2.
Figure 8B:
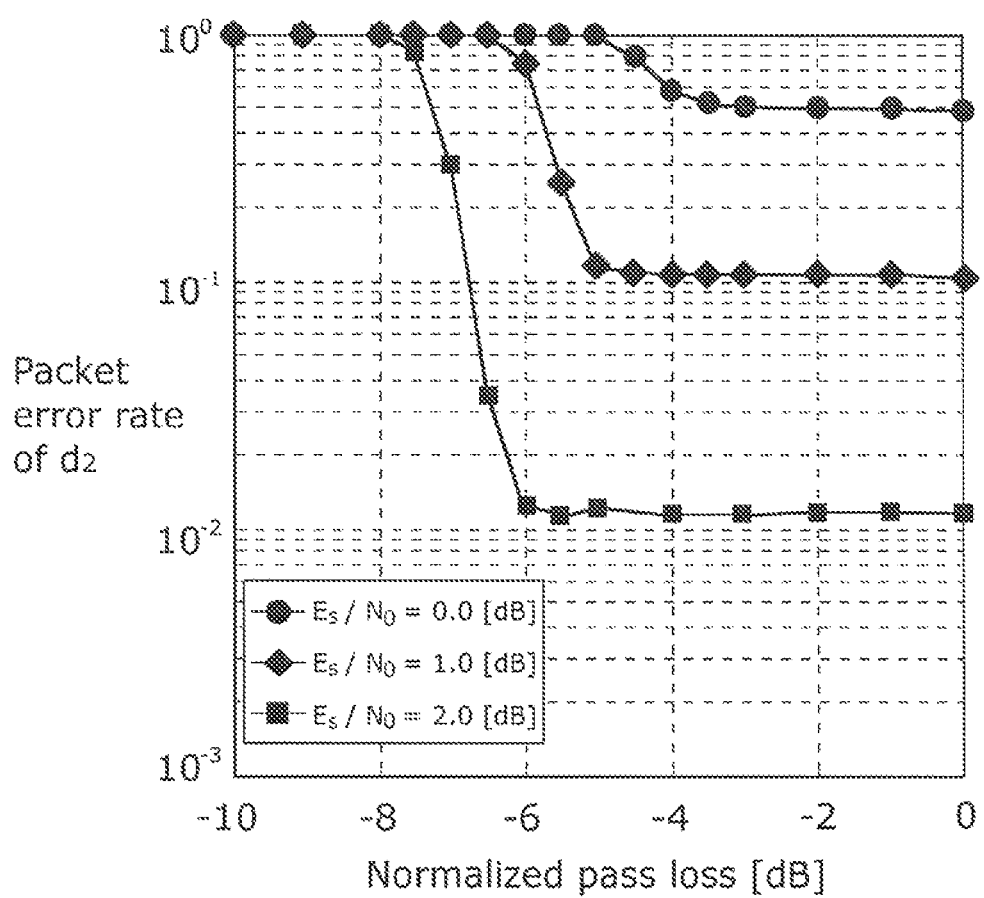
FIG. 8B is a diagram showing PER characteristics of an information bit sequence $d_2$ in the scenario 3 according to Embodiment 2.

Each of FIG. 8A and FIG. 8B shows the PER characteristics in the conventional scenario 3. The characteristics of the proposed scheme in the scenario 3 that does not require an increase in the number of required time slots are considered for the case where the received power which can be obtained between $U_1$ and D is −6 [dB] or higher compared to the received power between $U_2$ and D. There is substantially no error in the detection of packets of $d_1$ as shown in FIG. 8A, and the characteristics of $d_2$ are the same as those in the scenario 2 as shown in FIG. 8B. Accordingly, the communication scheme in this embodiment is applicable.

A description is given of a method of determining a relay node (node $U_2$ 50) that relays a signal that is transmitted from a transmission node (node $U_1$ 40) to a destination node (node D 60) when the communication scheme in this embodiment is applied.

Figure 9:
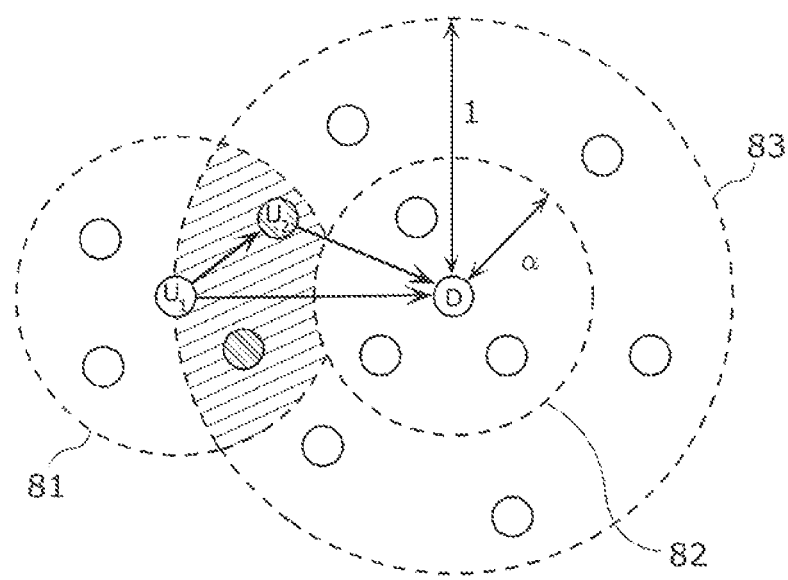
FIG. 9 is a schematic view for illustrating a method of determining a relay node in Embodiment 2.

FIG. 9 is a schematic view for illustrating a method of determining a relay node in this embodiment. In the diagram, the signal is assumed to be transmitted from the node $U_1$ to the node D. In addition, each of circles drawn by a solid line is a communication node.

A first condition that should be satisfied by a relay node is that the relay node is capable of accurately receiving a signal from the node $U_1$. Accordingly, a candidate is the node included in a circle 81 having a predetermined radius and has the node $U_1$ as its center (candidates are four communication nodes in the example of FIG. 9). The radius at this time is determined by the power of the signal from the node $U_1$. For example, the radius increases with an increase in the power of the signal from the node $U_1$.

A second condition that should be satisfied by the relay node is that the relay node is located (i) outside the circle 82 having the node D as its center, having a radius of $\alpha$, and included in a circle 83, and (ii) within the circle 83 having the node D as its center, and having a radius of 1, when the distance from the node $U_1$ and node D is 1. In other words, the conditions that should be satisfied by the relay node are that the distance between the relay node and the destination node is shorter than the distance between the transmission node and the destination node, and that the distance between the relay, node and the destination node is longer than the predetermined distance.

Here, the predetermined distance, that is the radius of $\alpha$ is determined using FIG. 8A and FIG. 8B. The radius of $\alpha$ is determined based on the relationship between the normalized path loss and the packet error rate (PER) and the received SNR as shown in FIG. 8A and FIG. 8B. More specifically, it is possible to reduce a PER more significantly with an increase in the received SNR even when a normalized path loss g is small (the true value of the normalized path loss is small). In other words, the radius of $\alpha$ is determined to be a smaller value when the received SNR is a larger value.

In this way, one of the two nodes hatched using right downward diagonal lines as shown in FIG. 9 is determined as the node $U_2$.

For example, when the received SNR is 2.0 dB, a packet error rate of approximately $10^{-2}$ is observed even when the normalized path loss is −6 dB in each of FIG. 8A and FIG. 8B. At this time, $\alpha$ is approximately 0.5 when the path loss of the received signal is according to the square-root law, whereas $\alpha$ is approximately 0.63 when the path loss of the received signal is according to the cube law.

A description is given of a method of determining the transmission node (node $U_1$ 40) in the case where the relay node (node $U_2$ 50) relays a signal transmitted from another transmission node to the destination node (node D 60) when the communication scheme in this embodiment is applied.

Figure 10:
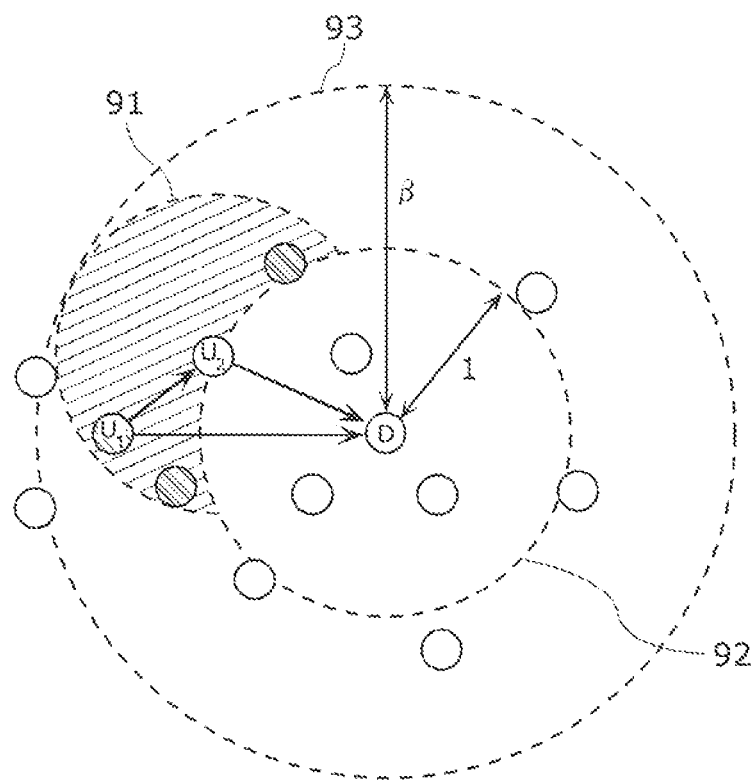
FIG. 10 is a schematic view for illustrating a method of determining a transmission node in Embodiment 2.

FIG. 10 is a schematic view for illustrating a method of determining a transmission node in this embodiment.
In the diagram, it is assumed that the node U2 relays the signal received from the other node. In addition, each of circles drawn by a solid line is a communication node.

The condition that should be satisfied by the relay node is that the relay node is capable of accurately transmitting the signal to the node $U_2$. Accordingly, a candidate is the node included in a circle 91 having a predetermined radius and has the $U_2$ node as its center (candidates are four communication nodes in the example of FIG. 10). The radius at this time is determined by the power of the signal from the node $U_1$. For example, the radius increases with an increase in the power of the signal from the node $U_1$.

A second condition that should be satisfied by the transmission node is that the transmission node is located (i) outside the circle 92 having the node D as its center, having a radius of 1, and included in a circle 93, and (ii) within the circle 92 having the node D as its center, and having a radius of $\beta$, when the distance from the node $U_2$ and node D is 1. In other words, the conditions that should be satisfied by the transmission node are that the distance between the transmission node and the destination node is longer than the distance between the relay node and the destination node, and that the distance between the transmission node and the destination node is shorter than the predetermined distance.

In this way, one of the three nodes hatched using right downward diagonal lines as shown in FIG. 10 is determined as the node $U_1$.

Here, as in the case of FIG. 9, the predetermined distance, that is the radius of $\beta$ is determined using FIG. 8A and FIG. 8B. For example, $\beta$ is approximately 2 when the normalized path loss is −6 dB and the path loss of the received signal is according to the square-root law, whereas $\beta$ is approximately 1.59 when the path loss at the received signal is according to the cube law.

The above descriptions are given taking examples of simple models in each of which the power difference at the time of reception is determined depending only on the communication distance. However, in reality, it is to be noted that the power difference is determined depending on various factors in addition to the distance. In this case, $\alpha$ and $\beta$ can be determined by measuring the received power level difference in communication lines.

The present invention has an object to reduce the number of times of transmission within a network in cooperative relay transmission in a multi-node relay environment. Thus, the above descriptions have been given of the relay transmission scheme by the cooperative coding utilizing the principle of the iterative LLR detection in BICM-ID. Furthermore, each of the computer simulations verified that the present invention is applicable to a simple network topology, and that it is possible to establish a cooperative relationship for obtaining a high coding gain even in an environment in which there is a difference in the power levels of received signals that reach the address node via two routes. With this feature, the present invention provides excellent flexibility in terms of the network topology in an environment in which multi nodes are omnipresent.

Although the present invention has been described based on the above embodiments, the present invention is not limited to these embodiments. Those skilled in the art will readily appreciate that many modifications are possible in the exemplary embodiments and other embodiments are possible by arbitrarily combining the structural elements of the embodiments without materially departing from the novel teachings and advantageous effects of the present invention. Accordingly, all of the modifications and other embodiments are intended to be included within the scope of the present invention.

For example, although the BPSK modulation scheme is used by the transmission device (node $U_1$) and the relay device (node $U_2$), another modulation scheme may be used.

However, it is desirable that the transmission device (node $U_1$) and the relay device (node $U_2$) use the same modulation scheme.

In addition, although two pieces of information are transmitted from the two transmission devices (node $U_1$ and node $U_2$) to one reception device (node D), three pieces of information may be transmitted from three or more transmission devices to one reception device.

In addition, although exclusive OR operation is performed to generate, from the two pieces of information, QPSK signals coded using natural binary coding, another logical operation may be performed. More specifically, it is only necessary that the signals are arranged at constellation points in a complex plane space such that the Euclidian distance between the constellation points is short, when at least one of a plurality of mutually corresponding pairs of bits included in the respective signals arranged at the constellation points is determined by iterative LLR calculation at the time of the reception of the signals.

INDUSTRIAL APPLICABILITY

The present invention is applicable to a multi user relay communication environment in the standardization of the next generation wireless communication system, or to a wireless distributed adhoc network based on wireless LAN.

REFERENCE SIGNS LIST

10 Transmitter
11, 12, 41, 51, 52 Channel encoder
13, 14, 27, 28, 43, 53, 54, 67, 68 Interleaver
15, 15a, 15b Symbol mapping unit
16, 46, 56 Transmission antenna
20 Receiver
21, 22, 61, 62 Channel decoder
23, 24, 63, 64 De-interleaver
25 Symbol de-mapping unit
26, 66 Reception antenna
30 Wireless channel
40 Node $U_1$
45, 55 BPSK modulator
50 Node $U_2$
57 Exclusive OR calculation unit
60 Node D
60 Cooperative decoder
69, 70 BPSK demodulator
81, 82, 83, 91, 92, 93 Circle

The invention claimed is:

1. A transmission method performed by a first transmission device and a second transmission device to transmit signals to a reception device which iteratively detects a log likelihood ratio in units of a pair of bits included in the respective signals at constellation points, the second transmission device being located closer to the reception device than the first transmission device, and said transmission method comprising:

generating a first signal by modulating a first bit sequence, and transmitting the generated first signal to the second transmission device and the reception device, said generating and transmitting being performed by the first transmission device;

receiving the first signal, and extracting the first bit sequence included in the received first signal, said receiving and extracting being performed by the second transmission device;

generating a third bit sequence by performing, in units of a pair of bits, logical operation on the first bit sequence extracted in said receiving and extracting and a second bit sequence, said generating being performed by the second transmission device; and generating a second signal by modulating the third bit sequence, and transmitting the generated second signal to the reception device, said generating and transmitting being performed by the second transmission device.

2. The transmission method according to claim 1,
wherein in said generating of the third bit sequence, the third bit sequence is generated when an exclusive OR of the first bit sequence and the second bit sequence is calculated by the second transmission device in units of a pair of bits.

3. A reception method comprising:
receiving, from a first transmission device, a first signal that is a signal resulting from attenuation, during propagation, of a signal generated by modulating a first bit sequence, and demodulating the received first signal, said receiving of the first signal being performed by a reception device;

receiving, from a second transmission device located closer to the reception device than the first transmission device, a second signal generated by modulating a third bit sequence generated by performing, in units of a pair of bits, logical operation on the first bit sequence and a second bit sequence, and demodulating the received second signal, said receiving of the second signal being performed by the reception device; and extracting the first bit sequence and the second bit sequence by iteratively calculating, in units of a pair of bits, reliability information indicating reliability of each pair of bits, using the first signal demodulated in said receiving and demodulating of the first signal and the second signal demodulated in said receiving and demodulating of the second signal, said extracting being performed by the reception device.

4. The reception method according to claim 3,
wherein in said extracting, which is performed by the reception device,
the first bit sequence and the second bit sequence are extracted by iteratively calculating a log likelihood ratio in units of a pair of bits included in the first signal and the second signal, the first signal and the second signal being assumed to correspond to one of Quadrature Phase Shift Keying (QPSK) signals arranged in a rectangle shape such that a real number component of the first signal is a real number component of the one of the QPSK signals and a real number component of the second signal is an imaginary number component of the QPSK signal.

5. A communication method performed by a plurality of communication devices to transmit and receive signals, said communication method comprising:
generating a first signal by modulating a first bit sequence, and transmitting the generated first signal, said generating and transmitting being performed by a first transmission device that is one of the plurality of communication devices;

receiving the first signal, and extracting the first bit sequence included in the received first signal, said receiving and extracting being performed by a second transmission device that is one of the plurality of communication devices;

generating a third bit sequence by performing, in units of a pair of bits, logical operation on the first bit sequence extracted in said receiving and extracting and a second bit sequence, said generating being performed by the second transmission device;

generating a second signal by modulating the third bit sequence, and transmitting the generated second signal, said generating and transmitting being performed by the second transmission device;

receiving a third signal that is a signal generated from the first signal when the first signal attenuated during propagation, and demodulating the received third signal, said receiving and demodulating being performed by a reception device that is one of the plurality of communication devices;

receiving the second signal, and demodulating the received second signal, said receiving and demodulating being performed by the reception device; and extracting the first bit sequence and the second bit sequence by iteratively calculating, in units of a pair of bits, reliability information indicating reliability of each pair of bits, using the third signal demodulated in said receiving and demodulating of the third signal and the second signal demodulated in said receiving and demodulating of the second signal, wherein the second transmission device is located closer to the reception device than the first transmission device.

6. The communication method according to claim 5, wherein a communication device that is located at a position at which a distance between the communication device and the reception device is shorter than a distance between the first transmission device and the reception device, and at which the distance is longer than a predetermined distance is determined as the second transmission device, and the predetermined distance is smaller when a signal to noise power ratio (SNR) of a signal received by the reception device is larger.

7. The communication method according to claim 5, wherein a communication device that is located at a position at which a distance between the communication device and the reception device is longer than a distance between the first transmission device and the reception device, and at which the distance is shorter than a predetermined distance is determined as the first transmission device, and the predetermined distance is larger when a signal to noise power ratio (SNR) of a signal received by the reception device is larger.

* * * * *

UNITED STATES PATENT AND TRADEMARK OFFICE
CERTIFICATE OF CORRECTION

PATENT NO. : 8,718,151 B2  
APPLICATION NO. : 13/202826  
DATED : May 6, 2014  
INVENTOR(S) : Shinsuke Ibi et al.

Page 1 of 1

It is certified that error appears in the above-identified patent and that said Letters Patent is hereby corrected as shown below:

In the Claims:

In column 20, line 16, "the first transmission device" should read --the second transmission device--.

Signed and Sealed this  
First Day of December, 2015

Michelle K. Lee  
*Director of the United States Patent and Trademark Office*